April 6, 1965    B. H. LEONARD, JR    3,177,122
MULTI-PURPOSE REACTOR
Filed Feb. 23, 1960    4 Sheets-Sheet 1

INVENTOR.
BYRON H. LEONARD JR.
BY
Sutherland, Polster & Taylor
ATTORNEYS

April 6, 1965  B. H. LEONARD, JR  3,177,122
MULTI-PURPOSE REACTOR
Filed Feb. 23, 1960  4 Sheets-Sheet 2

*INVENTOR.*
BYRON H. LEONARD JR.
BY
*Sutherland, Polster + Taylor*
ATTORNEYS

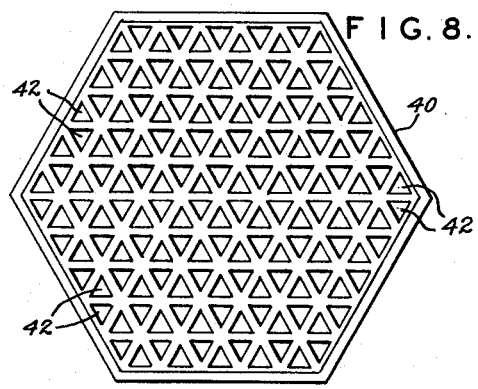
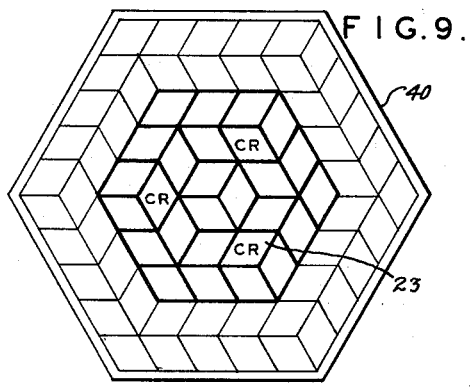
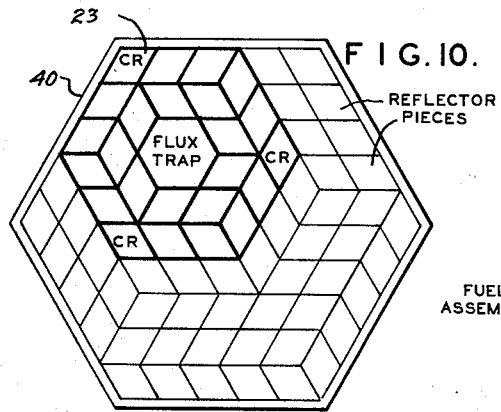
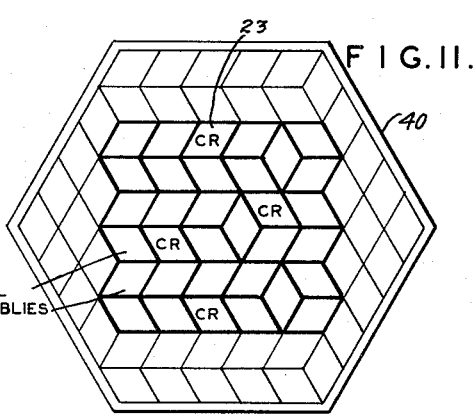
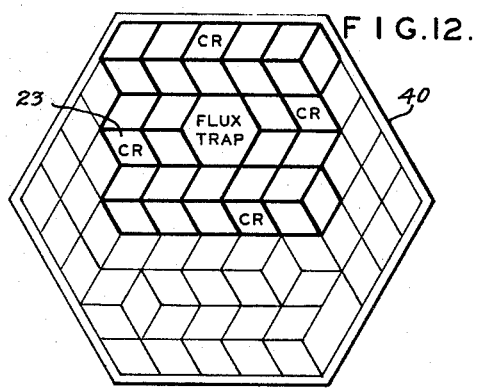
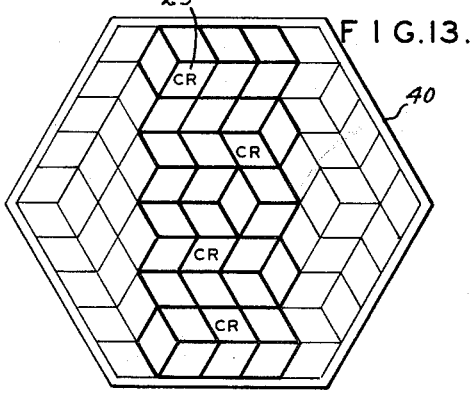

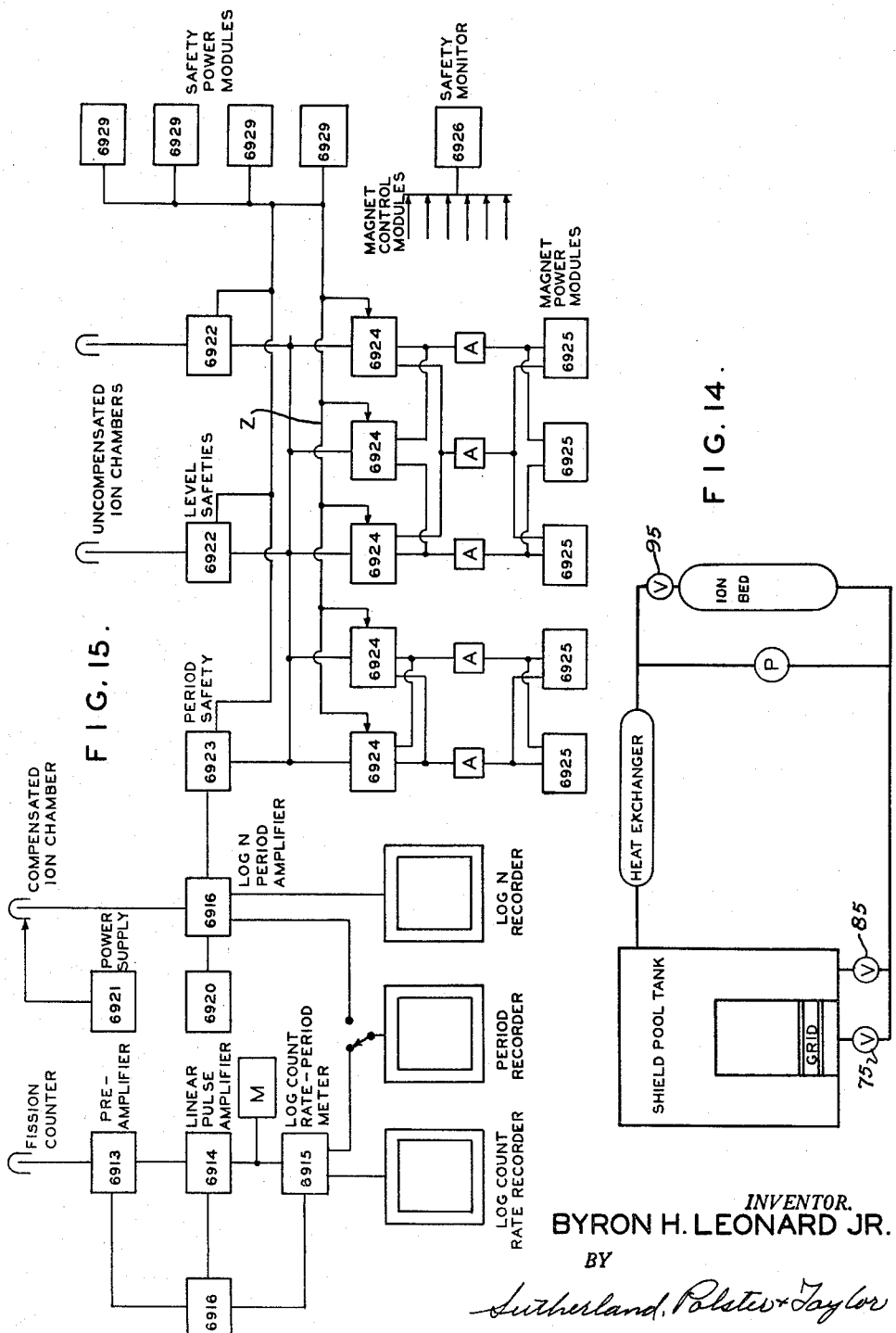

3,177,122
MULTI-PURPOSE REACTOR
Byron H. Leonard, Jr., Ladue, Mo., assignor to Internuclear Company, Clayton, Mo., a corporation of Missouri
Filed Feb. 23, 1960, Ser. No. 10,344
7 Claims. (Cl. 176—40)

This invention relates to multi-purpose nuclear reactor of the pool type and more particularly to a light water shielded facility, for this purpose sometimes referred to as a swimming pool type of nuclear reactor. This type of reactor is among the most versatile and economical tools available for nuclear research and training. These machines are known for their intrinsic flexibility, because of the easy, direct access to the core, and the direct observation through the water shield are unique features of this design, the arrangement of the core is therefore easily accessible by hand operated tools so as to change its configuration quickly and with complete safety.

It is one of the objects of this invention to improve upon the flexibility of present machines in this respect, so as to obtain extreme versatility from this type of facility.

It is one of the objects of this invention to provide a facility which may be used as a critical facility for testing or training.

It is one of the objects of this invention to provide a facility with changeable configuration, location and composition, so as to provide for changes ranging from very small degree in each of these attributes.

It is also an object of this invention to provide a facility not only flexible in core configurations but also flexible in experimental facilities, such as metal to water ratio, core void fractions, fuel loadings both in individual assemblies and in elements, fuel moderator ratios, and/or void fractions in the core. Since the core is readily accessible, various experimental measurements may be made for various changes in configuration and composition of the core, including measurements of temperature coefficients of reactivity.

According to this invention, a hexagonal core tank is located at the bottom of a pool in spaced symmetrical relation with the walls of the pool, and contains a supporting grid therein in which are mounted the fuel assemblies. The assemblies in turn are four-sided containers of diamond shaped cross-sections which are simple to produce, and, therefore, less expensive. The grid also supports other containers, if desired, which can be sealed units containing heavy water, graphite, beryllium or aluminum in various amounts, etc. The diamond shape of the container permits their location in a predetermined relationship and configuration in side by side contact to fill said core tank, so that the outer containers are in side by side contact with the walls of the core tank and no voids are left unless these are desired, except those of diamond shape for receiving cross shaped blades of the regulating rods or control rods. On the outside of the core tank are special chambers which may be packed with reflector material, or flooded to provide bulk shielding. With this arrangement, it is also possible to insert containers of polyethylene or de-mineralized light water into the core for providing a moderator. Other organics may also be used in this manner. It is contemplated that it will be necessary under some circumstances depending upon the operating power to heat the pool water in order to obtain temperature coefficients of reactivity for the different core arrangements. A simple system is provided for this purpose which can also be converted to cooling, and in such cases, the configuration of the core will have no effect upon the cooling efficiency of the coolant flow, because the cross-sectional configuration of the containers in the core tank permits the tank to be filled with the containers in side by side contact with each other and with the sides of the core tank. Suitable instrumentation is provided for monitoring and control systems.

The following specification includes a description of the best mode now contemplated by the inventor for carrying out his invention, which when taken with the accompanied drawings will enable any person skilled in the art to make and use the invention. In the drawings:

FIG. 8 is a top view of the grid in the core tank;

FIGS. 9, 10, 11, 12 and 13 are schematic views showing some of the possible arrangements of the containers to form a core within the core tank;

FIG. 14 is a schematic view of the piping diagram; and

FIG. 15 is a schematic illustration of the circuits for the monitoring and control system.

Description

Figure 1:
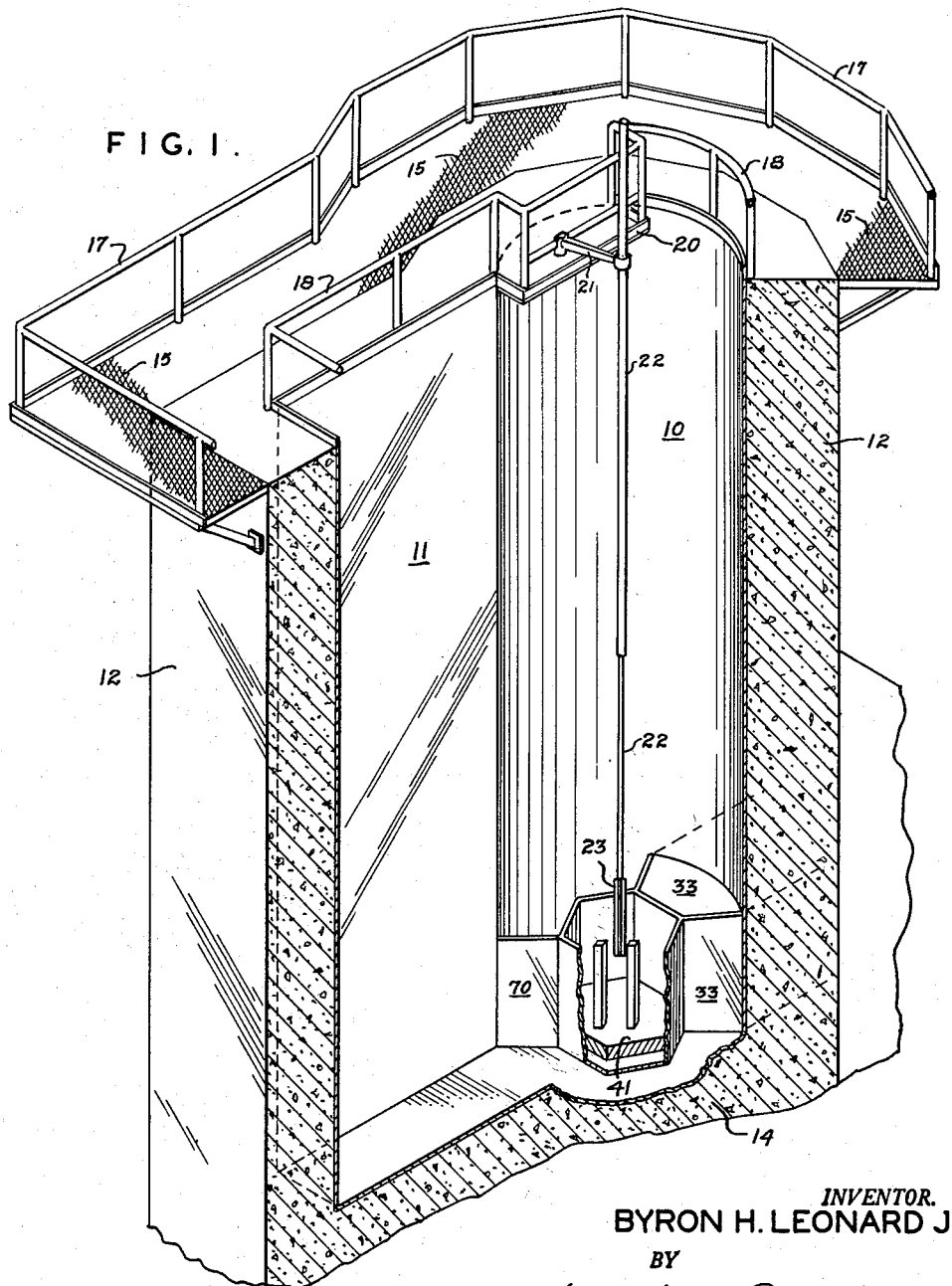
FIG. 1 is a perspective view of the nuclear reactor with parts broken away so as to illustrate the general arrangement of parts according to this invention.
Figure 5:
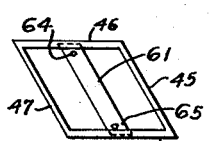
FIG. 5 is a top view of FIG. 3.
Figure 2:
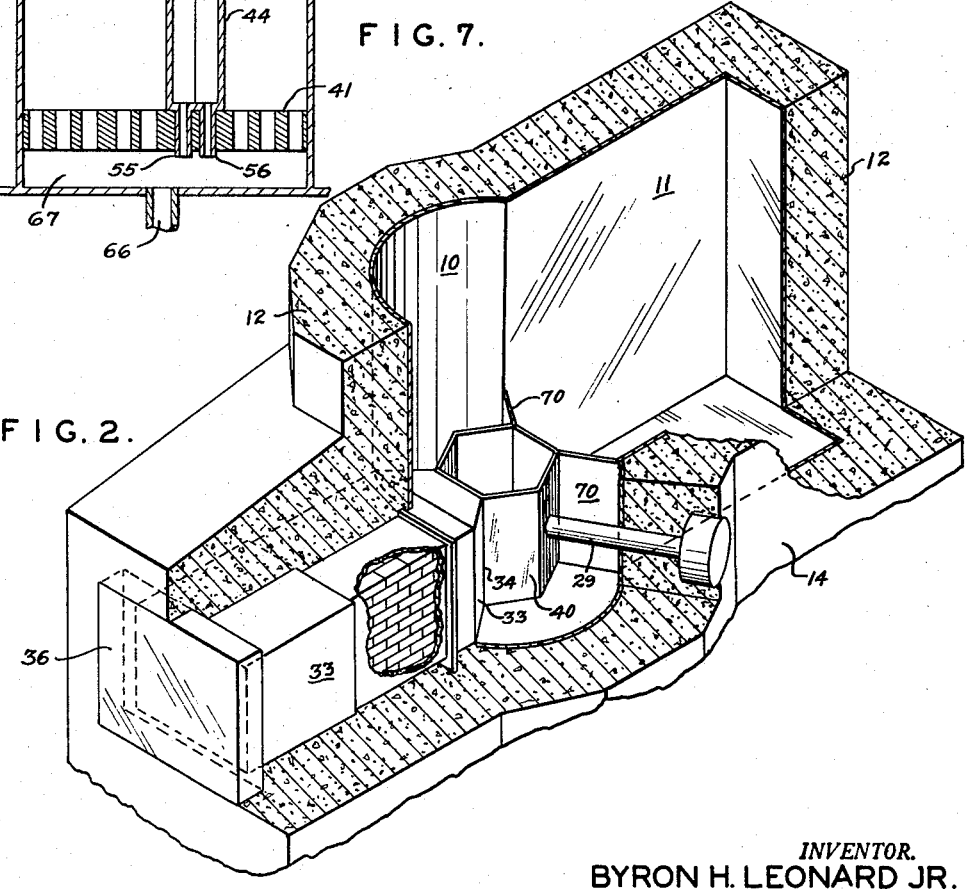
FIG. 2 is also a perspective view with parts broken away showing the opposite end of the reactor from that shown in FIG. 1.

The general arrangement of elements in the nuclear reactor are shown best in FIG. 1. According to this view, the reactor has a circular tank constructed of aluminum, as shown at 10, with an entry or extension which is primarily rectangular, illustrated at 11, opening from one side of the tank 10 to form a bulk shielding facility and canal. Around the tank 10 and 11 is a concrete shield 12 made of dense aggregate. The circular portion of the pool 10 is approximately 5 feet in diameter, and the concrete shielding around the pool 10 and 11 may be as thick and as high as necessary to provide for a depth of water above the core to properly shield the core for the desired operating power. The bottom of the pool has a concrete base 14 for supporting the bottom of the aluminum tank 10 and 11. At the top edge of the concrete shielding is a grating 15 providing a walkway surrounding the pool, and this may be, and preferably is, provided with a railing, such as 17, at its outer edge, and a railing, such as 18, at its inner edge to provide for safety for the personnel while working about the reactor. At the top of the shielding there is also a bridge generally indicated as 20, and this bridge supports a plurality of swinging cranes 21, one of which is shown. Crane 21 in turn supports a control or regulating rod generally indicated as 22. At the lower end of the rod 22 is cross shaped blades 23, and the rod contains mechanisms for moving the blades up and down within the core of the reactor so as to increase or decrease the flux, and thereby maintain the reactor power at the desired level. The blades are usually made of cadmium which is an effective absorber, but other materials are contemplated, such as hereinbefore described. The number of rods used is variable. As many as four might be necessary, in which case two can be supported on the bridge 20 on one side of the reactor and the other two on the bridge on the opposite side of the reactor not shown. Each bridge also carries a safety rod which can be positioned manually from the bridge and automatically released, so as to drop into the core to produce a scram condition and shut down the reactor. Projecting through the side of the shielding at intervals about the periphery of the core are beam hole assemblies 29. In addition, the reactor may be provided with a thermal column which includes a housing 33 made of aluminum and welded on one face 34 to the core tank 40. The housing 33 has walls which are welded to the bottom of the tank 10 and to its sides so as to provide a housing. The housing 33 projects through the shielding as best shown in FIG. 2. The outer end of the housing is filled with a lead plug 36, and between the lead plug and the wall of the core tank 40 are graphite bricks to act as a moderator. The constructions, so far described, are in some respects wholly conventional in nuclear reactors of this type, and like in prior constructions during operation of the reactor the tanks 10 and 11 are filled with water, and between experiments of one kind or another the operators stand upon the bridge 20 and manipulate the assemblies in the core by handling tools which extend downwardly through the water into the core. If, between the experiment, it is necessary to move any of the control rods, this is possible because of the pivotal mounting of the small crane 21 holding the control rod mechanism. Otherwise, the control rods 22 contain the necessary mechanism for their automatic operation from the monitoring system of the reactor control.

Figure 3:
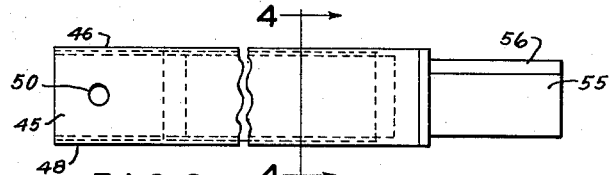
FIG. 3 is a side view of one of the containers used in the core of the nuclear reactor shown in FIG. 1.
Figure 4:
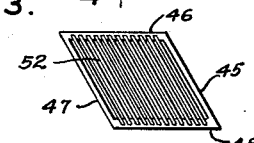
FIG. 4 is a transverse sectional view taken on the line 4—4 of FIG. 3.
Figure 6:
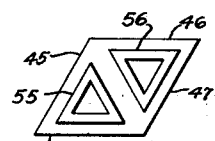
FIG. 6 is a bottom view of FIG. 3.

According to this invention, the pool 10 contains a concentrically mounted core tank 40 hereinbefore mentioned, and in the core tank adjacent its bottom is a grid 41. The grid has spaced triangular openings 42 (FIG. 8) for positioning the diamond shaped containers, hereinafter described. These particular containers are all constructed similar to the illustrations in FIG. 3 through FIG. 6, inclusive, to which reference is here made. Each container has four side walls 45, 46, 47 and 48 joined at their longitudinal edges, as shown in FIGS. 3 and 4, to form diamond shaped containers. The term polygonal is regarded as descriptive of both the diamond shaped containers and triangular anchors 55 and 56 hereinafter described. The tops of the containers containing fuel plates are left open and opposite walls are provided with holes 50, one of which is shown. A lifting bar 61 is removably secured with its ends in the holes 50 by pins 64 and 65. In the case, the containers are sealed, a container end is inserted and sealed below the hole 50 and within the container. However in the present case, the upper ends are open, and two of the side walls 46 and 48 are grooved to receive the fuel plates collectively indicated here as 52. Preferably, these fuel plates are slidable in the grooves in the side walls 46 and 48, so that they may be removed and replaced either with other fuel plates or with hollow plates of metal, so as to vary the void ratio for experimental purposes and alter the metal to water ratio. The lower end of the fuel element has triangular tubular extensions 55 and 56 through which the moderator may be pumped from the plenum chamber below the grid or downwardly through and between the fuel plates 52 for cooling purposes, or for heating for that matter. Tubular extensions 55 and 56 are slidably received in the triangular holes 42 of the grid in FIG. 8. The spaced triangular holes of the grid provide the necessary firm anchorage for the fuel assemblies or containers, so that they can be arranged side by side in contact in various angular positions. This flexibility of arrangement is hereinafter described with reference to FIGS. 9–13.

Figure 7:
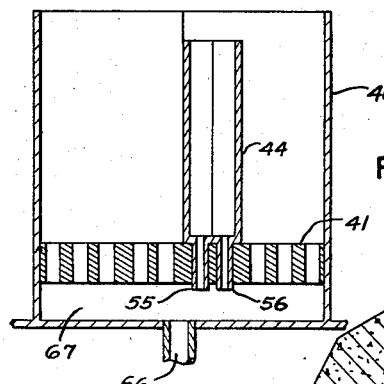
FIG. 7 is a side elevation in section of the core tank shown in FIG. 1 with a container mounted therein.

Turning now to FIG. 7, here illustrated is the manner in which a container is supported in the grid within the core tank 40. The grid has an upper member 41 with a plurality of spaced triangular apertures, such as 42, distributed in a predetermined arrangement or pattern. Triangular extensions 55 and 56 are tubular and open into the containers for the fuel elements 52, so as to form a path of flow from the tank 10 through the container 44, tubes 55 and 56 into plenum 67 to outlet 66. Each container 44 is removably anchored in the grid in any one of a plurality of angular positions. Between experiments, it can be removed and reinserted by a handling tool engaging bar 61. After insertion, fuel plates may be changed, removed or rearranged in container 44 by first removing pins 64 and 65 and bar 61. The plates 52 are individually apertured to provide a grip for a handling tool. Of course, the need for cooling depends upon the power level of operation of the nuclear reactor core, and a suitable piping system is shown and described hereinafter, which will permit circulation from the tank for heating or cooling and for purification of the water contained in the tank.

As stated heretofore, the containers 44 may contain either fuel plates or elements, such as above described, or the containers may be used for reflecting materials or moderators. In any case, the configuration of all of the containers 44 is diamond shaped in cross-section, which allows for infinite variety of configuration and arrangement, some of which are indicated in FIGS. 9, 10, 11, 12 and 13, in these figures are a combination of fuel assemblies which are shown in heavy lines and reflector pieces shown in light lines. The spaces CR indicate the openings in the core for the control or regulating rods 23, heretofore described. In case it is desirable to provide in a core a flux trap or internal reflector, this may be done by omitting three containers to form a hexagonal shaped void as illustrated in FIG. 10. Regardless of the core arrangement desired, the core tank can be completely filled with all of the containers in side by side contact with one another and the walls of the core tank, so as to provide comparable test results in each instance. Turning now to FIG. 1 again, it will be noted that the core tank 40 is connected with the tank wall by an aluminum partition 70, one on each side of the core. This provides two compartments between the wall 70, or partition 70, and the wall 33 of the thermal element, diametrically opposed, into which reflector material may be packed.

In FIG. 14 is shown a schematic illustration of the water circulation and the purification system, which is, it is believed, self-explanatory. It might be mentioned, however, that the two valves 75 and 85 provide alternative paths of circulation. When valve 85 is open, the circulation is to and from the pool tank 10, in this case, it may be necessary to add heat to the water, in which case the pump P is run in the direction to discharge the water taken from the tank through the heat exchanger and back to the pool tank 10. On the other hand, when it is desired to provide cooling, valve 85 may be closed and valve 75 opened, this causes a circulation from tank 10, through containers 44 and tubes 55 and 56 into the plenum chamber 67 and out pipe 66 to the pump. Warm water leaving the tank will be cooled by passage through the heat exchanger. Regardless of which way the water is circulated by the pump, some of it will pass through the ion bed, and that amount will be determined by the amount the valve 95 is opened. Thus the amount of purification done during each cycle of circulation depends upon the amount the valve 95 is opened. This circuit provides a very simple and inexpensive arrangement, which together with the other simplified features, hereinbefore described, lend to an overall inexpensive installation.

The electric control circuit and instrumentation, illustrated in FIG. 14, is wholly conventional and employs only commercially available equipment of standard design, each of the circuits can be easily removed and replaced with readily available components, and proven circuitry may be obtained with substantial savings in time, effort and development cost.

The illustration of the circuits and instruments in FIG. 14 is wholly schematic, and since it is conventional the description will be brief since it forms no part of the instant invention, and is included here merely for purposes of disclosing a complete and operative nuclear reactor system. Referring specifically to FIG. 15, the left side of the sheet shows the start-up and intermediate channels for monitoring the multi-purpose reactor, and the right side of the sheet and connected to the monitoring system is the safety system. The monitoring and control system, above referred to, is based upon units of standard design which are readily obtainable commercially. This has inherent advantages from the maintenance and replacement angles as well as cost, and such a proven circuitry requires no development. It should be understood that the instrumentation schematically represented is made sufficiently complete, so that a description of each component and the function in the system can be described. A feature of the system is the removability and replacement of the components, which can be made by simple plug in connections which will not result in shut down of the reactor. For simplification of the description here, the components are indicated by the particular code number used by a standard supplier.

The neutron flux monitoring channels are more or less independently operable, and three neutron flux monitoring channels have been used, a pulse channel, a logarithmic channel and a safety channel. The pulse channel operates during the initial reactor start-up from source level, and this pulse channel or start-up channel is the only channel sufficiently sensitive to monitor the neutron flux at this level. Referring directly to FIG. 15, the neutrons are detected by a non-integrating type of fission or $BF_3$ chambers that produce electrical pulses for each neutron event. Output from these chambers after preamplification in component 6913 is fed to a linear pulse amplifier 6914 which amplifies the pulse. The output pulses of the linear pulse amplifier are counted by a conventional scaler indicated as M and also integrated by a log count rate-period meter 6915 to give a counting rate signal and a period signal which are then fed to the log count rate recorder and period recorder. Period recorder is connected by a switch S with the log count rate period meter, which switch is preferably the automatic type. The information furnished on the recorders is a printed indication of neutron multiplication during the sequence of initial reactor start-up operation. The pulse channel described covers four decades from source level to the start of the intermediate or logarithmic channel.

As the pulse channel approaches the end of its range, the logarithmic-period channel begins to respond. The detector is a compensated ion chamber which produces a current proportional to the flux level. The operation and nature of such devices is well understood in the art. Briefly neutron bombardment of aluminum foil produces alpha-particles which in their passage through the gas of the ion chamber creates positive ions which are attracted to a negatively charged plate producing minute currents. This current is the input of a log $n$ period amplifier 6916, which in turn produces a linear signal in the 0–10 mv. range proportional to the logarithm of the current input or the flux level. This signal will cover the range of from 0.001% to 300% full power. A resister capacitor network in the amplifier module differentiates the logarithmic power level signal to give the time rate of change of flux or reactor period. A 0–10 mv. signal is produced in the period network covering a range of minus 30 to plus 3 seconds. These two signals are fed to the log $n$ recorder and the period recorder. The period recorder is the same recorder as the start-up channel and is automatically switched by the switch S as the start-up channel reaches its upper limit.

The log $n$ period amplifier 6916 in turn is connected to the safety channel, which contain controls responsive to neutron flux level above preset limits to produce a scram condition for fast shut down, or responsive to rate of power increases in the reactor core for the same purpose. It will be understood from a reading of this description so far, that the control rods or regulating rods 22 all contain mechanism which is electrically powered for operating the rods within the core, and this mechanism is connected with a drive train coupled by an electro-magnet, whereby de-energizing of the magnet releases the container 23 with its moderator to drop into the core of the reactor. Each of these magnetic couplings are indicated as A in the accompanying FIG. 14. Furthermore, the modules designated as level safety 6922 and period safety 6923, each contain a single preamplifier, a sigma amplifier, and a fast scram circuit. Therefore, the number of safety amplifiers is exactly equal to the number of primary input signals. Each safety amplifier has its own filament transformer. Plate and bias voltages are obtained from the safety power modules 6929 with the positive voltage also providing the power for an uncompensated ion chamber. The signal outputs from the safety amplifiers are auctioneered. Therefore, the voltage at the sigma bus, indicated as Z, is determined by the highest safety amplifier output. The plug in feature of input amplifier allows for prompt removal from the system if failures occur in individual modules. The safety monitor 6926 adequately monitors and warns the operator should abnormal conditions arise in the safety systems. The safety monitor also permits the measurement of the necessary quantities to calibrate and test the entire safety system. It performs the following functions:

(1) Continuous indication of power level as measured by the level safeties and the reactor period as measured by the period safety.

(2) Measurement of the output voltages of the safety power modules.

(3) When a failure annunciation occurs, controls allow the operator to locate the faulty supply quickly.

(4) Measurement of cathode current in every magnet amplifier, this measurement permits location of a faulty circuit in the event of failure. Incipient failures can also be located before complete breakdown.

(5) Measurement of each safety pre-amplifier output. Calibration of each safety amplifier is possible with this measurement and a calibrated test signal located at each level safety input.

(6) Measurement of total current in each solenoid or electro-magnet, and high current alarm.

(7) Measurement of sigma bus potential.

(8) Measurement of all load-shared output current.

A construction has been described which will fulfill all of the objects of the instant invention, but it is contemplated that other modifications will occur to those skilled in the art which come within the scope of the appended claims.

Having thus described the invention, what is claimed and desired to be secured by Letters Patent is:

1. A multi-purpose nuclear reactor for testing and training purposes having a core tank of hexagonal shape containing a supporting grid and a core within said tank removably supported by said grid, said core comprising, a plurality of diamond shaped containers arranged in side by side contact to fill said core tank, some of said containers enclosing replaceable elements containing nuclear fuel and hollow plates and others enclosing neutron reflector, moderator, and absorber materials, means on said containers received in said grid for removably supporting and orienting said containers individually in selected locations and various angular positions at the selected location to form various core configurations.

2. A multi-purpose nuclear reactor for testing and training purposes providing in one facility the flexibility for duplication of the conditions prevalent in many different types of nuclear reactors, said reactor comprising a core tank of symmetrical geometric shape, a grid of similar shape supported adjacent the bottom of said tank, a plurality of diamond shaped fuel assemblies removably anchored in said grid and cooperating means on said fuel assemblies and grid for anchoring said fuel assemblies thereon in selected locations and various angular positions at selected locations for arrangement in various predetermined core patterns.

3. A multi-purpose nuclear reactor for testing and training purposes having a core tank of polygonal shape, a supporting grid and a core supported by said grid, said core comprising, a plurality of diamond shaped containers, a pair of spaced anchoring members projecting from said containers to removably secure the containers in said core and spaced apertures in said grid for receiving said spaced anchoring members arranged in groups of at least three at a plurality of locations to hold said fuel containers in more than one selected angular position at a selected location.

4. A multi-purpose nuclear reactor for testing and training purposes having a supporting grid and a core containing nuclear fuel supported by said grid, said core comprising, a plurality of fuel assemblies each including a container of regular diamond shape in section and otherwise of similar shape and size containing nuclear fuel holding elements constructed and arranged to form fluid passages extending from one end to the other end of said container, a pair of spaced tubular anchoring members of the same external sectional shape and size projecting from and connected to one end of the container and forming a continuation of the fluid passages extending from end to end of said container, said anchoring members being adapted to removably secure said assemblies to said grid and form a fluid connection permitting flow therethrough, and a plurality of apertures in said grid of complementary shape to the external sectional shape of said anchoring members to form therewith a fluid connection, said apertures being grouped in spaced relation so that when one of said anchoring members is positioned to be received by one of said apertures the other anchoring member of the same fuel assembly can be received in a plurality of apertures in the group around the one aperture so that the grid provides for orientation of a fuel assembly.

5. A multi-purpose nuclear reactor for testing and training purposes having a supporting grid and a core containing nuclear fuel supported by said grid, said core comprising, a plurality of fuel assemblies each including a container of similar shape and size and section containing nuclear fuel holding elements constructed and arranged to form fluid passages extending from one end to the other end of said container, a pair of spaced tubular anchoring members of the same external triangular sectional shape and size projecting from and connected to one end of the container and forming a continuation of the fluid passages extending from end to end of said container, said anchoring members being adapted to removably secure said assemblies to said grid and form a fluid connection permitting flow therethrough, the adjacent sides of adjacent anchoring members being parallel, and a plurality of apertures in said grid of complementary shape to the external sectional shape of said anchoring members to form therewith a fluid connection, said apertures being grouped in spaced relation so that when one of said anchoring members is positioned to be received by one of said apertures the other anchoring member of the same fuel assembly can be received in a plurality of apertures in the group around the one aperture so that the grid provides for orientation of a fuel assembly.

6. A multi-purpose nuclear reactor for testing and training purposes having a supporting grid and a core of nuclear fuel supported by said grid, said core comprising, a plurality of fuel assemblies each including a tubular container of regular diamond cross-sectional shape containing nuclear fuel holding elements constructed and arranged to form fluid passages extending from one end to the other end of said container, pairs of spaced anchoring members of like external sectional shape and size projecting from and connected to one end of the containers at least one of wihch is tubular and forms a continuation of the fluid passages extending from end to end of said containers, said anchoring members being adapted to removably secure said assemblies to said grid and confine the flow of fluid through the grid to said anchoring members throughout the area of the grid supporting said fuel assemblies, and a plurality of apertures in said grid of complementary shape to the external sectional shape of said anchoring members to form a fluid connection with one of said members of each of said containers, said apertures being grouped in spaced relation so that when one of said anchoring members is positioned to be received by one of said apertures the other anchoring member of the same fuel assembly can be received in a plurality of surrounding apertures in the group so that the grid provides for orientation of each fuel assembly.

7. A multi-purpose nuclear reactor for testing and training purposes having a supporting grid and a core of nuclear fuel supported by said grid, said core comprising, a plurality of fuel assemblies each including a container of tubular shape in section with not more than four sides containing nuclear fuel holding elements constructed and arranged to form fluid passages extending from one end to the other end of said container, pairs of spaced anchoring members of like external regular triangular sectional shape and size projecting from and connected to one end of the containers at least one of which is tubular and forms a continuation of the fluid passages extending from end to end of said containers, adjacent sides of adjacent anchoring members being parallel, said anchoring members being adapted to removably secure said assemblies to said grid and confine the flow of fluid through the grid to said anchoring members throughout the area of the grid supporting said fuel assemblies, and a plurality of apertures in said grid of complementary shape to the external sectional shape of said anchoring members to form a fluid connection with one of said members of each of said containers, said apertures being grouped in spaced relation so that when one of said anchoring members is positioned to be received by one of said apertures the other anchoring member of the same fuel assembly can be received in a plurality of surrounding apertures in the group so that the grid provides for orientation of each fuel assembly.

References Cited by the Examiner

UNITED STATES PATENTS

| 2,780,596 | 2/57 | Anderson | 176—58 |
| 2,832,732 | 4/58 | Wigner | 176—50 |
| 2,841,545 | 7/58 | Zion | 176—18 |
| 2,894,893 | 7/59 | Carney | 176—41 |
| 2,917,444 | 12/59 | Dreffin | 176—51 |
| 2,929,768 | 3/60 | Madlmeister | 176—41 |
| 2,952,600 | 9/60 | Newson | 176—35 |
| 2,961,393 | 11/60 | Monson | 176—18 |
| 2,981,673 | 4/61 | Johnson | 176—75 |
| 2,985,574 | 5/61 | Newson | 176—24 |

OTHER REFERENCES

Nucleonics, November 1952, pp. 56–58.

Proceedings Second United Nations Conference on the Peaceful Uses of Atomic Energy, United Nations, N.Y., 1958, pp. 203, 204, 225, 242, and 243, vol. 10.

Research Reactors, TID–5275 (1955), AEC Document, p.193.

Sylvania Technologist, January 1956, vol. 9, No. 1, p. 4.

Charpie: Reactors, McGraw-Hill, 1956, pp. 49–77.

Winkleblack, ANL-4551, AEC publication, December 1949.

Leyse: AECD-3682, June 5, 1953.

CARL D. QUARFORTH, *Primary Examiner.*

ROGER L. CAMPBELL, LEON D. ROSDOL,
*Examiners.*

UNITED STATES PATENT OFFICE
CERTIFICATE OF CORRECTION

Patent No. 3,177,122                                                      April 6, 1965

Byron H. Leonard, Jr.

It is hereby certified that error appears in the above numbered patent requiring correction and that the said Letters Patent should read as corrected below.

Column 6, line 59, for "and", first occurrence, read -- or --; column 7, line 75, for "wihch" read -- which --.

Signed and sealed this 16th day of November 1965.

(SEAL)
Attest:

ERNEST W. SWIDER                                   EDWARD J. BRENNER
Attesting Officer                                        Commissioner of Patents